April 17, 1945.        L. COUTURE        2,373,872
WEED REMOVING TOOL
Filed May 22, 1944
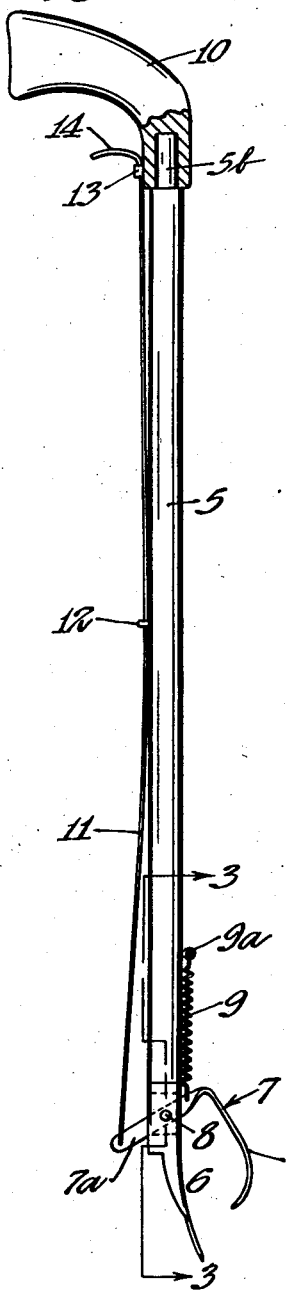
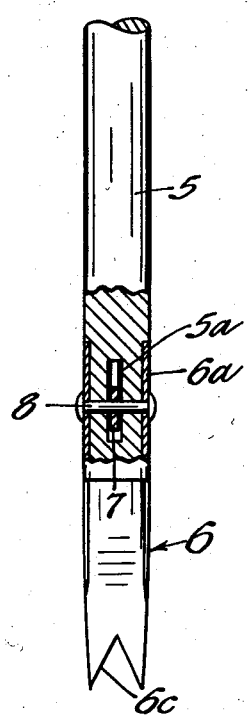
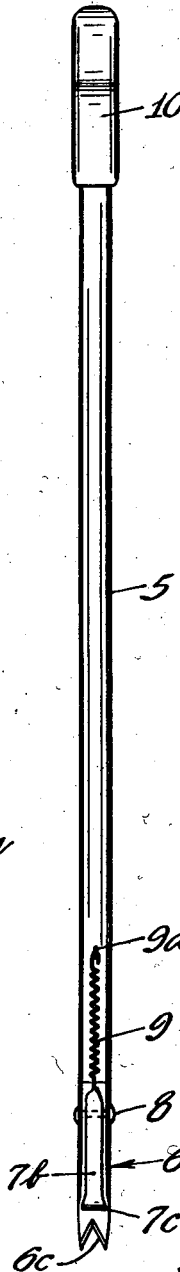
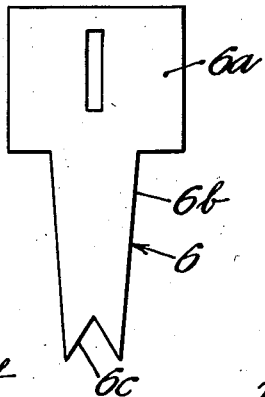
INVENTOR.
Louis Couture
BY
Williamson & Williamson
ATTORNEYS Patented Apr. 17, 1945

2,373,872

UNITED STATES PATENT OFFICE 2,373,872

WEED REMOVING TOOL

Louis Couture, Minneapolis, Minn.

Application May 22, 1944, Serial No. 536,659

2 Claims. (Cl. 294—50.9)

This invention relates to weed removing tools and particularly to a device which may be easily handled and operated for both pulling or cutting such coarse weeds as dandelions, milkweed and the like.

It is an object of my invention to provide a very simple but highly efficient weed extractor which may be very rapidly and easily operated with one hand; which may be manufactured at relatively low cost and which may be used to cut the root of such a weed as a dandelion considerably below the surface of the ground and to thereafter remove the top and upper portion of the root and which may also be utilized to pull a weed and root bodily from the ground without severing the same.

A more specific object is the provision of a weed extracting tool having a swingable gripping arm at its lower end associated with a depending blade and further provided with a pistol grip and trigger rod associated therewith at its upper end to enable the device to be very readily forced into the ground at its blade portion and to conveniently operate the gripping arm by trigger pressure. With my device the entire operation is controlled by one hand enabling a large number of weeds to be extracted in relative short time.

These and other objects and advantages of my invention will be more apparent from the following description made in connection with the accompanying drawing, wherein like reference characters refer to the same parts throughout the several views, and in which—

Figure 1 is a side elevation of an embodiment of my invention, a portion of the pistol grip being broken away to show its connection with the upper end of the staff handle;

Figure 2 is a front elevation of the same;

Figure 3 is a fragmentary rear elevation on a somewhat larger scale, some portions being broken away to show pivoting of the gripping lever and connection of the shank of the blade at the lower extremity of the handle;

Figure 4 is a plan view illustrating a suitable blank from which my entire blade may be integrally constructed.

As shown in the drawing, my weed extraction tool comprises an elongated straight handle or staff 5 having its lower end slightly reduced in diameter to snugly fit the annular collar 6a integrally attached to the shank portion 6b of a depending blade 6. Blade 6 may be conveniently constructed from a blank of suitable sheet steel or other metal formed to provide the annular collar 6a and with a shank of the blade formed in concavo-convex cross section for strengthening purposes and having at its lower extremity an inverted V-shaped cutting edge 6c, which is adapted to guide and shear the root of a weed several inches below the surface of the ground. The lower end of handle 5, as shown, is provided with a diametric slot 5a to accommodate the medial portion of an angle arm lever indicated as an entirety by the figure 7. Lever 7 has a shorter straight end 7a which extends through slot 5a and is pivoted to the handle and slot 5a by means of a diametric pivot pin 8. The opposite end of lever 7 is turned or twisted with reference to the arm 7a, to form a curved depending gripping arm 7b which is associated with the medial portion of the inner or front face of blade 6. Gripping arm 7b extends downwardly and then inwardly terminating in a straight transverse edge 7b which is opposed to the shank of the blade a short distance above the upper end or vertex of the V-shaped edge 6c. A coil spring 9 is connected at its lower end with the right hand portion of the lever arm 7a and is secured at its upper end to an eyelet 9a fastened to the handle.

The upper end of the handle or staff 5 is diminished at 5b to receive the lower portion of a solid pistol grip member 10 which has a socket drilled in said lower end to tightly surround the reduced portion 5b of the handle. A screw, brad or other securing means may be driven through the upper end of the handle and the lower portion of the pistol grip to rigidly secure the same. The butt of the pistol grip 10 extends at an angle to handle 5, being preferably at almost a right angle thereto, and formed to afford a convenient and firm grasp for the operator.

An elongated resilient trigger rod 11 is pivotally secured at its lower end to the outer extremity of the straight arm portion 7a of the gripping arm and extends upwardly substantially parallel with the handle 5 and, as shown, is slidably guided through an eyelet 12 at the rear side and medial portion of handle 5 and adjacent its upper end through a second eyelet 13 which is secured to the lower portion of the pistol grip 10 in alignment with the lower eyelet 12. The upper end of trigger rod 11 is bent outwardly to form a trigger 14 although it will, of course, be understood that trigger 14 may be a separate member fixed to the upper part of rod 11. Triggers 14 is disposed just below the hand grip portion of pistol grip 10 for convenient manipulation by finger pressure in the manner of operating the trigger of a pistol.

Operation

In operation of my improved device on a lawn or garden, the tool is entirely manipulated by one hand and may be depressed vertically into the ground with the blade 6 positioned just behind the main root of a coarse weed. The blade is pushed into the ground for several inches if desired up to the lower edge of the attachment collar 6a and with the index finger the trigger 14 is pulled, swinging gripping arm 7b downwardly to engage the plant or weed usually slightly below the ground level but a short distance above the cutting edge 6c. Thus the weed is gripped and the tool may then be raised with the same hand and the trigger subsequently released to discharge the gripped weed in a container or upon a pile.

In so operating my tool coarse weeds having very large roots may be cut by pushing the blade into the ground near the root, the forwardly curved construction of the blade as shown in Figure 1 causing the blade to be guided to cut the root at several inches below the ground level or if desired the tool may be utilized to grip and bodily pull coarse dandelions or weeds from the ground without severing the root. The blade is simply forced into the ground some slight distance behind the root in which case the cutting edge will not engage or dissect the root but will be disposed in close relation thereto and upon operation of the trigger the gripping arm will with association of the blade grasp the root and upward pulling of the tool will then dislodge the entire root without severing the same.

From the foregoing description it will be seen that with my device weeds may be very quickly removed from gardens or lawns with a minimum effort on the part of the operator and utilizing only one hand for entirely operating the device.

It will, of course, be understood that various changes may be made in the form, details, arrangements and proportions of the parts without departing from the scope of my invention.

What I claim is:

1. A weed extractor comprising an elongated handle, a blade constructed from an integral piece of sheet material having a shank portion provided with an annular collar at its upper end and having an inverted V-shaped cutting edge at its lower extremity, said shank, between said cutting edge and said collar being curved outwardly along its length and being also curved circumferentially for reinforcing purposes, said annular collar surrounding the lower end of said handle and being secured thereto, a lever pivoted to the lower portion of said device having a depending gripping arm extending inwardly at its lower portion and opposed at its lower extremity to the concave medial portion of said blade, said lever having a shorter arm extending beyond the rearward side of said blade, a hand grip attached to the upper portion of said handle, means for urging said gripping arm to retracted position, and means operated from said hand grip for swinging said gripping arm against said blade.

2. A weed extractor comprising an elongated handle, a combined blade and mounting constructed from an integral blank of sheet material having extension portions at its upper end, curved circumferentially to form a collar, said collar being provided with a vertical slot for reception and guiding of a gripping lever, said blank having a depending shank tapered downwardly from its connection with said collar portion and being curved circumferentially to a point adjacent the lower end thereof and being curved longitudinally and outwardly from said collar to its lower edge, said lower edge being bevelled for cutting, a lever extending through said vertical slot in said annular collar and guided thereby and having a depending inwardly curved gripping arm opposed to the concave medial portion of said blade and having a shorter arm extending beyond the rearward side of said blade, a common pin for securing said annular collar to the lower end of said handle and for also pivoting said lever in said blade, means for urging said gripping arm to retracted position and means operated from the upper end of said handle for swinging said gripping arm against said blade.

LOUIS COUTURE.